United States Patent
Keller et al.

(10) Patent No.: US 7,136,850 B2
(45) Date of Patent: Nov. 14, 2006

(54) SELF TUNING DATABASE RETRIEVAL OPTIMIZATION USING REGRESSION FUNCTIONS

(75) Inventors: Martin Keller, Vaihingen (DE); Calisto P. Zuzarte, Pickering (CA)

(73) Assignee: International Business Machines Corporation, Armonk, NY (US)

(*) Notice: Subject to any disclaimer, the term of this patent is extended or adjusted under 35 U.S.C. 154(b) by 479 days.

(21) Appl. No.: 10/720,246

(22) Filed: Nov. 25, 2003

(65) Prior Publication Data
US 2004/0128287 A1  Jul. 1, 2004

(30) Foreign Application Priority Data
Dec. 20, 2002  (EP) .................................. 02102873

(51) Int. Cl.
*G06F 17/30*  (2006.01)
(52) U.S. Cl. .............................. 707/4; 707/2; 707/100; 707/200
(58) Field of Classification Search .............. 707/1–10, 707/100–104.1, 200–206; 708/1–3, 6–8; 715/538
See application file for complete search history.

(56) References Cited

U.S. PATENT DOCUMENTS

| | | | |
|---|---|---|---|
| 5,761,653 A | * | 6/1998 | Schiefer et al. ................ 707/2 |
| 6,738,755 B1 | * | 5/2004 | Freytag et al. ................. 707/2 |
| 6,763,359 B1 | * | 7/2004 | Lohman et al. ............. 707/102 |
| 6,778,976 B1 | * | 8/2004 | Haas et al. ..................... 707/2 |
| 6,947,927 B1 | * | 9/2005 | Chaudhuri et al. ............ 707/3 |
| 2004/0059743 A1 | * | 3/2004 | Burger ....................... 707/101 |

OTHER PUBLICATIONS

Lise Getoor, et al.; "Selectively Estimation Using Probabilistic Models"; ACM SIGMOD 2001, May 21 24, Santa Barbara, California, 12 pages.

* cited by examiner

*Primary Examiner*—Shahid Alam
*Assistant Examiner*—Jean Bolte Fleurantin
(74) *Attorney, Agent, or Firm*—Greg Plow

(57) ABSTRACT

A system and method for accessing a relational database and estimating the selectivity of a query (e.g., an SQL query) in order to better predict the number of qualifying records for simple and complex queries. A dataset is created based upon queries applied against the database by the user community. The dataset is populated with information related to query conditions and their respective combinations. A regression function reflecting correlations between query conditions is generated and used as a data mining model to calculate table-specific estimates for the cardinality of subsequent queries. An appropriate access method is then selected from a set of available access methods based upon the number of estimated query-qualifying records. By periodically updating the regression model with FIFO managed queries, a self-tuning mechanism is achieved resulting in better selectivity/result size estimates for use in selecting access methods used in compiling subsequent SQL queries applied against the database.

26 Claims, 3 Drawing Sheets

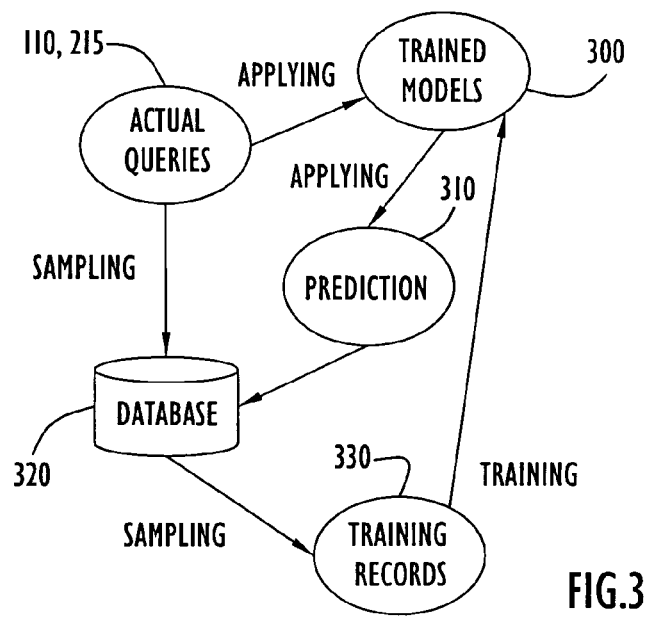
FIG.3
| AGE | SALARY | | ROWS |
|---|---|---|---|
| 200 | 1000 | | 100 |
| | | | |
FIG.4
| | A | B | C | ROWS |
|---|---|---|---|---|
| (A,B) | 10 | 5 | | 4 |
| (A,C) | 10 | | 7 | 3 |
| (A,B,C) | 10 | 5 | 7 | 1 |
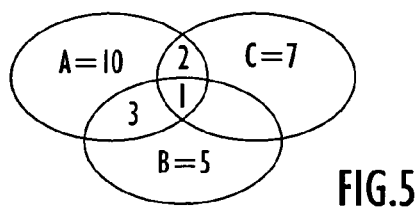
FIG.5

SELF TUNING DATABASE RETRIEVAL OPTIMIZATION USING REGRESSION FUNCTIONS

1. BACKGROUND OF THE INVENTION

1.1. Field of the Invention

The present invention relates to the area of Relational Databases. More specifically, the invention relates to improvements of methods for accessing a relational database and estimating the selectivity of a query, e.g., an SQL query.

1.2. DESCRIPTION AND DISADVANTAGES OF RELATED ART

1.2.1 Introduction to Related Art

SQL queries are often issued against one or more relations in a relational database by specifying filtering or joining predicates. A simple query is "SELECT NAME, AGE, SALARY FROM EMPLOYEE WHERE AGE>=40 AND SALARY>=100000". This EMPLOYEE relation contains various attributes or columns. The predicate AGE>=40 requests all employees that are 40 years or older and, in addition, the predicate SALARY>=100000 asks for the selection to provide the result set of the employees who earn $100000 or more.

Before actually retrieving the data, a conventional cost based (access) "Optimizer" known to be used in Relational Databases relies on result size estimates in order to determine optimum access plans to retrieve the requested data from the database. The result size estimates help with choosing between different access method alternatives (e.g., table scans or index-based methods, prefetching from disk, or random access) for providing an optimum use of resources.

When several relations are involved in the query, the optimum access plan needs to consider the best choices between various join methods and join orders as well. An exemplary query involving two relations is "SELECT NAME, AGE, SALARY FROM EMPLOYEE, DEPARTMENT WHERE AGE>=40 AND SALARY>=100000 AND EMPLOYEE.ID=DEPARTMENT.MGRID".

Here, the EMPLOYEE relation is joined with the DEPARTMENT relation by matching the employee identification number (ID) with the ID of the manager of the department. The access plan could choose to access the DEPARTMENT table first and then join in the EMPLOYEE relation using a particular join method. If the result set after applying the AGE and SALARY predicates on EMPLOYEE is small enough, it might make more sense to start with the tuples in the EMPLOYEE relation and then join in the tuples from the DEPARTMENT relation. It is thus important to know the result size estimate after accessing the EMPLOYEE table to make this decision. With several relations involved, a bad intermediate result size estimate can possibly cause the optimizer to choose a sub-optimal plan for the rest of the query. This could lead to intolerable performance when the sub-optimal plan is deployed to retrieve the data.

1.2.2 Details of Related Art Disadvantages

To estimate selectivities of queries, i.e., to determine the result size of a query, related art optimizers typically use statistics collected through a general utility. These statistics might for example collect the number of distinct values or the high and low values. Here for example, if the high and the low value in the AGE column were 70 and 20, and there were 1000 employees, when assuming uniformity, a simple interpolation formula could be used to derive the estimate for AGE>50. This would be 1000*((70−50)/(70−20))=400. More elaborate techniques involve collecting distribution statistics like most frequent values or histograms. Splitting the value range into such buckets would allow the user to obtain better selectivity estimates particularly when there is skew.

With additional predicates on other attributes, even with these statistics, it is difficult to estimate the combined effects of the predicates. Most related art optimizer implementations in relational databases employ the so-called "attribute value independence"—assumption as a minimum. The assumption is that there is no correlation between the AGE and SALARY attributes. The probabilities or selectivity factors are multiplied to get the combined selectivity factor. It could, however, be realized that, more often than not, the older the employee, the greater the salary. The assumption could hurt the user here as the result size would be under-estimated in the example above. If, for example, the AGE>=50 applies to 40% of the 1000 employees and SALARY>=100000 selects 30% of the employees, the result size estimate would be 1000*0.4*0.3 or 120 employees. In the actual scenario, it is quite possible that all employees earning 100000 could be more than 50 years old. In other words, the actual result set size could have been 300. The error due to column value independence is often magnified significantly when several attributes are involved.

One solution proposed in the related art to this problem is to collect so-called multi-column histogram statistics. With histogram statistics on AGE and SALARY combined, the estimates could probably be much better. When the number of attributes involved in the multi-column histograms increases, less accuracy, however, will be expected, and the size of the histogram needs to be increased significantly, in order to get any meaningful usage of the statistics.

Other related art techniques using statistics on auxiliary structures like so-called soft constraints, materialized views or virtual columns also exist. These could be informational entities, for which only the statistics are retained in the database. This provides information in a more specific way than multi-column histograms.

For this, however, as with the multi-column statistics, there is considerable analysis necessary to decide what information needs to be set up. Each auxiliary structure can provide information to a limited set of queries. As such, considerable information needs to be collected and maintained for this to be generally useful. Mining through the data for this information possibly using the query workload as input might make this task easier. However, maintaining this information with changing workload and data may require considerable skill and time for highly qualified staff, which may be extremely costly for an enterprise.

"Join-predicate" selective estimation in general is not a trivial problem, and most large commercial databases use a uniformity assumption in order to simplify the estimation procedure. One solution for long running queries is to sample the data before planning. The practicality of this is in question. Choosing suitable sampling rates in a query that involves multiple relationships is not a trivial issue. Other solutions proposed in the related art for join size estimation use so-called wavelets.

This, however, does not account for combinations of selection predicates on individual relations and join predicates between relations.

A more recent related art proposal as disclosed in L. Getoor, B. Taskar and D. Koller, Selectivity Estimation using Probabilistic Models, In SIGMOD, ACM Press, 2001, uses a probabilistic model based on Bayesian Networks. The technique suggested there handles estimates for both, selections from a single table and for JOINS across multiple relations, using a probabilistic model that is set up in an off-line training mode. Subsequently, a query is fed through the model to give the estimate. This related art publication does not, however, suggest an on-the-fly learning method to adapt to changing data.

1.2.3 Summary of Related Art

Assumptions of uniformity, column value independence and the static nature of information used to estimate the size of result sets of queries limit the ability to get good estimates in general. One issue relates to the dynamically changing content of a database table. The other issue is the correlation between the various attributes or columns of a database relation or tables. A complete description of the access optimization problem reflecting those issues will result in a statistic table describing all possible combinations of logical expressions which may be multiple times greater than the data table itself. This is caused by the multiple possible combinations which can be used within a table. Even worse, it is unknown, which combinations are really used and which are not.

1.3. Object of the Invention

It is thus an object of the present invention to provide a method and system which provides for better prediction of the number of qualifying records for simple and complex queries.

2. SUMMARY AND ADVANTAGES OF THE INVENTION

According to its basic aspect, the present invention discloses a method for estimating the selectivity of a query, the query comprising one or more of column-associated conditions related to column attributes of a table of a given relational database, which is characterized by the steps of:
a) generating a dataset from sampling actual queries raised against the database, the dataset comprising various query conditions and their respective actual use combinations,
b) using the dataset for determining at least one regression function and the regression function reflecting correlations between certain ones of the conditions,
c) using the regression function as a data mining model for calculating a table-specific estimate result for the cardinality of a query.

Further advantageously, it is proposed to use the estimate result for the cardinality of an incoming query for selecting an access method out of a plurality of different ones for accessing the database adapted to the estimate result of the number of query-qualifying records associated with the incoming query. By periodically updating (280) the models with FIFO managed queries, a self-tuning mechanism is provided that determines better selectivity or result size estimates that can be effectively used during compilation of SQL queries that are issued against the database.

For improved clarity of the terms "selectivity" and "cardinality", the following serves as an illustration:
An (absolute) cardinality of 200 may be used for instance in a query having the condition c:
age>30, and qualifying 200 rows.
A preferred way, however, is to use a relative cardinality referred to herein as "selectivity" by applying the ratio:
(Number of query-qualifying records)/(Number of all records in a respective table)
The selectivity is much more stable in a statistical sense for adding and deleting of records from a table.

Thus, the present invention enables doing a transformation of a query to a cardinality-based regression function used as a Data Mining model, which can be trained and used for cardinality prediction, and thus for finding an improved database access plan for either simple or complex queries.

When further, in case the query is a query covering columns from a plurality of different tables, the method comprises the step of using the table-specific estimate result as an input parameter for a further calculation of a table-combining cardinality estimate, then the above basic approach can also be applied for those multiple table query situations.

When further, in relation to a single-table processing
a) the generated dataset comprises queries $q_j$, $j=1, \ldots N$, each query comprising a plurality of column-associated conditions $c_{jk}$, $k=1, \ldots M_j$, N, M being integer variables, the method further comprises the steps of:
b) recording the cardinality C of an elementary operation associated with a respective single condition $c_{jk}$ comprised of the query,
c) recording the number Q of query-qualifying database records—which is the "observed" measure—reflecting the correlation between the database table column attributes referred to in each elementary operation,
d) calculating a cardinality estimate CE of the query with the following formula:

$$CE = \sum_{i=1,\ldots L} f(Z_i) \qquad \text{(eq. 1)}$$

whereby $f(Z_i)$ is a regression function, L being the number of columns in the table, CE represents a total of correlations between the plurality of combinations of elementary operations $Z_i$ used in the sampled queries, and $Z_i$ describes the frequency of occurrence for one or more query conditions $c_{jk}$ referring to a respective same database column,
e) and a Data Mining method is used for generating the regression function, then a preferred, systematic way is used for achieving a selectivity estimate for a query, which is open to cover very complex queries comprising an even larger plurality of column-associated conditions, as $c_{jk}$ is a 2-dimensional quantity, covering the number j of queries and for each query a number of $M_j$ conditions. Thus for giving an illustrative example:
$c_{11}$, $c_{12}$, $c_{13}$, with first query's $M_1=3$,
$c_{21}$, $c_{22}$, $c_{23}$, $c_{24}$, $c_{25}$, with second query's $M_2=5$,
$c_{31}$, with third query's $M_3=1$,
$c_{41}$, $c_{42}$, $\ldots c_{48}$, with fourth query's $M_4=8$,
etc., may exist.

Basically, after the training of the model has been completed, it can be applied for estimating the actual "daily work" database queries, at least in those preferred situations, to which the model was specifically trained for. In the remaining query situations, other conventional access determination might take place.

In short, the present invention provides a self-tuning mechanism that determines better selectivity or result size estimates that can be effectively used during compilation of SQL queries that are issued against the database. The present invention describes a way to help give better selectivity estimates to the user in a way that tunes itself based on previous experience in terms of information compiled and actual results collected over time.

The method provides for improvements for simple and complex database queries. SQL is used in here as an example only. Thus, it is possible to predict the number of qualified records and therefore to determine the optimum retrieval buffer size for SQL queries.

The invention further proposes an improvement of database access by focusing on the queries used most often. This implies that the result set sizes of more often used queries are predicted more precisely than queries with less often used combinations of predicates. This special, basically optional feature thus focuses the most relevant queries and neglects other more seldom used queries that results in a self-tuning mechanism optimizing the predictive model automatically over time and usage.

The present invention is thus based primarily on the following processes which are as follows:

1. Sampling of Mining Data (Sampling):
   A set of queries is collected and thus generated in which each query fulfills some predetermined requirements:
   a) the query must be applicable for Data Mining methods, that is, it does not comprise certain logical expressions which are explicitly excluded, as they are too difficult to handle with Data Mining methods (see later below),
   b) the result size is large enough,
   c) the query is relevant, i.e., is done often enough by the users, which is obtained by cross reference to existing query statistics.

Thus, the number of database I/O processes and the size of the sample data are the most important factors during sampling.

Each query is advantageously transformed into either, its "conjunctive normal form", or its disjunctive normal form, or any other form adapted to simplify the calculation of the selectivity of the query. In case of selecting the preferred conjunctive normal form, the query transformation comprises only AND connectors connecting between expression parts. Each of such parts, e.g., AGE>30 representing a respective elementary condition, which is associated with a single query, is preferably associated with a single training record. Thus, a record preferably comprises a plurality of such elementary conditions in order to reflect the correlations between the respective conditions.

2. Creation of Mining Models (Training).
   The number of database tables and the size of the sample data are the most important factors influencing the execution time.

3. Application of the Mining Models (Applying).
   The computation overhead required by the inventive method is very small.

The performance issues for sampling of mining data are as follows:

The writing of the sample records is the most important factor here. One sample record for each query can be basically created, but in practice, this would be too costly. Thus, the queries are preferably filtered to reduce the number of sample records and therefore the I/O costs.

Simple filter criteria imply to sample only each n'th record, n=1, . . . N, with N being some large number, as e.g., N=100. A more precise criterion will, however, take into account the strengths of the Data Mining based, present invention approach. This is the more precise estimation of queries having AND or OR based correlations and JOINs.

The preferred first criterion is thus to sample only such queries, which contain correlation conditions or JOIN conditions.

A preferred second criterion is basically independent from the first one, and is thus to sample queries, where the actual retrieved number of records is greater than a certain predetermined threshold (for instance k*buffer page size of a particular database in use).

Further, in order to achieve a good scalability of the present invention method to any size of database (e.g., from smaller ones until large ones having several ten thousand of tables), a Data Mining Model is created for each table separately. Further, performance issues for the present invention Mining model generation are as follows:

The maximum number of sample records for each table may be limited to an adequate maximum value, e.g., Maximum=Number of columns*10, in order to get a statistically significant sample. A minimum value is preferably also defined e.g., Minimum=Number of columns*3.

Sample size: [MAX=#cols*10, MIN=#cols*3] records.

The number of database tables having a mining model may be limited, if desired.

The model generation may be stopped at any time. The present invention models are consistent, even if only a set of them are regenerated.

The models may be generated in parallel. Each model can be generated independently from the other models.

Further, when providing a repeated training of a Data Mining Model with respective updated sample data, this enables the resulting selectivity estimate to be closely related to the current content of the database varying over time. Thus, the present invention estimation is self-adapting to a dynamically changing content of, and changing queries to a database.

When further an existing database-associated access optimizer tool is used to sample the queries, an existing API can be used with the present invention to implement some of the present invention method steps in program form.

Further, queries comprising so-called INNER JOINS across multiple tables are basically processed according to the invention by adding a term J to the formula (eq. 1) given above which reflects the number of qualified records of the JOIN condition of the "JOINed" table. Further details are given below.

3. BRIEF DESCRIPTION OF THE DRAWINGS

The present invention is illustrated by way of example and is not limited by the shape of the figures of the drawings in which:

FIG. 3 is a schematic representation of the basic structure used in FIGS. 1 and 2.

FIG. 4 is a table illustration of an AND comprising query sample.

FIG. 5 is a schematic representation of AND connected sets.

4. DETAILED DESCRIPTION OF THE PREFERED EMBODIMENT

With general reference to the figures and with special reference now to the basic steps of sampling and training, an application of a preferred embodiment of the present invention method, as well as an overview of the physical structure thereof will be described in more detail.

Figure 1:
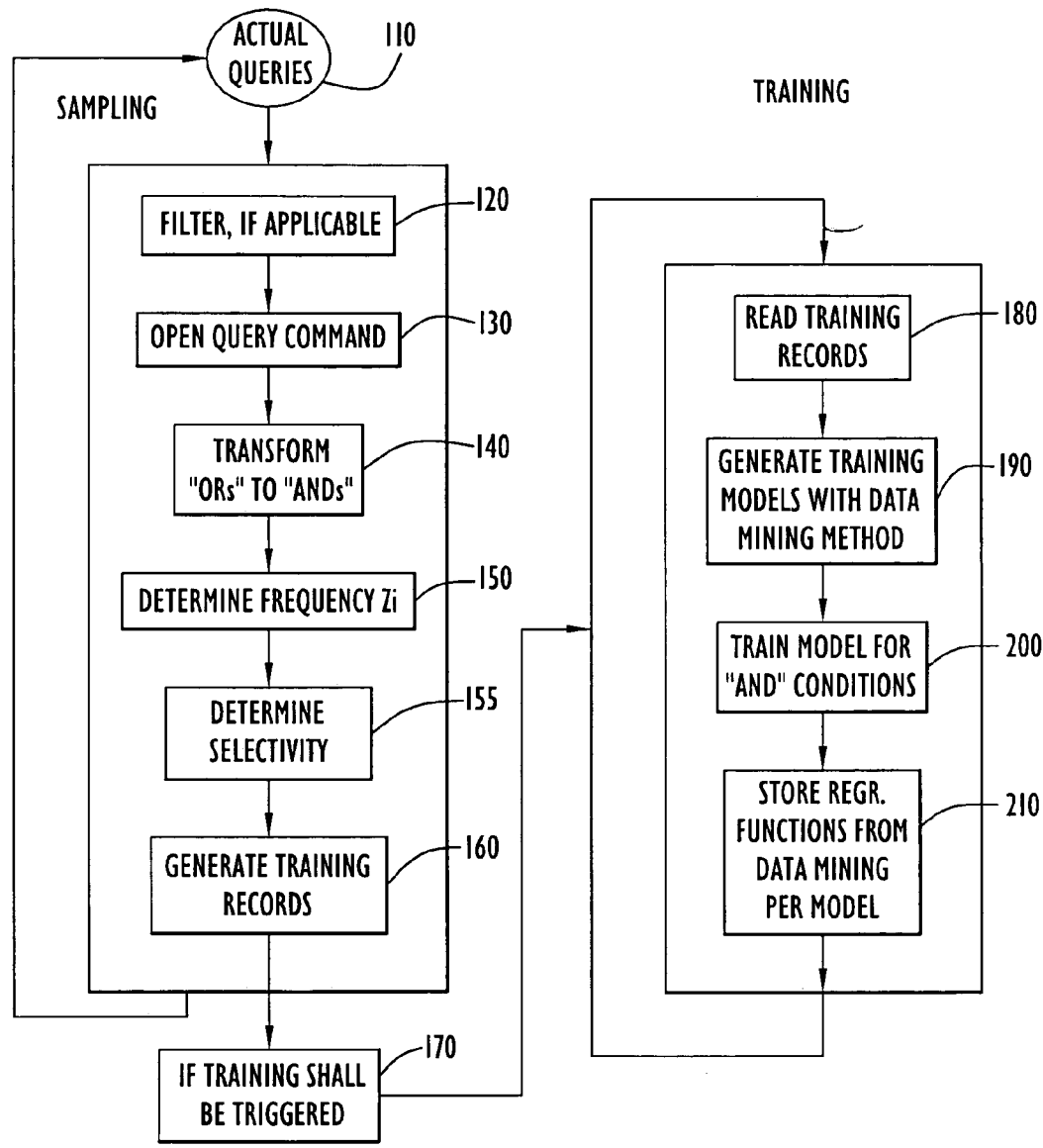
FIG. 1 is a schematic representation of the basic control flow in a sampling procedure of the present invention for incoming queries, and during generation and Training of respective models.

In FIG. 1 illustrating sampling and training according to the present invention, a set 110 of SQL queries $q_j$, j=1, ... N, is assumed to be given as they are intercepted by an interface provided by the present invention. Such queries represent "daily life" accesses to a given database. Each query $q_j$ has one or more conditions $c_{jk}$, k=1, ... $M_j$ like "AGE>30".

In a step 120, the query is first checked in a filtering step, if it is usable for the purposes of the present invention. If usable, the query does not comprise the following limitative subject matter:

A complex expression having SQL keywords e.g. UNION, DIFFERENCE and INTERSECT cannot be addressed by the present invention concept, because such keywords are operations on a single attribute level and not on frequencies of attributes, for which the model is primarily trained by the present invention;

Nor can subqueries (>all, >any, exist) be addressed, due to the difficulty of training a model for this type of prediction;

Nor can computed expressions like "(income*tax_rate>average_tax)" be addressed, because in most cases there is no statistical evidence to forecast a new expression with the knowledge from an old expression, i.e., the cardinality of (average_tax) is not correlated to (average_tax+10)

At the end of filtering, a query that meets the above criteria is processed by the invention.

Then, in a step 130 the query command is opened for processing.

In step 140, basically any OR condition is removed from the query. The original logical expression of the query is replaced by a BOOLEAN equivalent which does not contain any logical OR connector, but instead, which comprises AND connectors.

This is done by basic Boolean transformations that are well known to a person skilled in the art.

The following example is given in order to illustrate this transformation and the handling of AND and OR conditions between columns:

The problem raised here depends on the logical difference between the following two queries:

SELECT * from TABLE where (AGE > 30.0 )
and (SALARY > 200000)
(query 2.1)
SELECT * from TABLE where (AGE > 30.0)
or (SALARY > 200000)
(query 2.2)

If care is not taken for the condition, there will be the same type of regression expression for both queries.

| AGE | SALARY | RECORDS |
|-----|--------|---------|
| 200 | 1000 | 100 for query 2.1 (AND) |
| 200 | 1000 | 1100 for query 2.2 (OR) |

To solve this problem in the preferred embodiment, the model is trained for AND conditions only (instead of training for OR conditions, and NOR, and XOR together).

Next, the handling of AND conditions will be explained with a sample query command:

SELECT*from Table WHERE AGE>30.0 AND SALARY>200000. According to the present invention, each column is represented by its frequency, which is depicted in FIG. 4. The AGE column has a frequency of 200, the SALARY column has a frequency of 1000. A number of 100 query-qualifying records exist in the database, which is indicated in the right most column in FIG. 4.

The Handling of OR Queries:

Boolean mathematics can be used to get the conjunctive normal form of a Boolean expression.

For (A and B) or (A and C) the default AND model is:

(A,B)+(A,C)−(A,B,C).

For (A and B) or (C and D) the default AND model is:

(A,B)+(C,D)−(A,B,C,D.)

For (A and B) or (C and D) or (E and F) the default AND model is:

(A,B)+(C,D)+(E,F)−(A,B,C,D)−(A,B,E,F)−(C,D,E,F)+(A,B,C,D,E,F)

A visual sample is given in FIG. 5: For (A and B) or (A and C) a Mining model is trained as illustrated in FIG. 5, with a BOOLEAN equivalent comprising only AND conditions.

The result of the transformation done in step 140 in FIG. 1 is thus:

(A,B)+(A,C)−(A,B,C)

4+3−1=6.

This is illustrated graphically in both, the upper part table, and the bottom part representation of elementary sets.

Next, with reference back to step 150 in FIG. 1, according to this embodiment a regression problem is built up such that the observed cardinality is:

$$\text{cardinality} = \sum_{i=1}^{L} f(Z_i) + \text{Error}$$

or the estimated Cardinality CE is:

$$CE = \sum_{i=1,...L} f(Z_i) \qquad \text{(eq. 1)}$$

where $f(Z_i)$ is a specific type of a regression function which predicts the above defined cardinality using some set of variables $Z_i$. For each column of the selected database table, a $Z_i$, exists such that it describes the frequency of record occurrence for one or more query conditions $c_{jk}$ referring to that database column. This is a simplification used to hold the number of independent variables small. The simplification is adequate because it focuses upon correlations between columns more than absolute cardinalities.

Instead of using the original SQL query conditions $c_{jk}$, these conditions are "mapped" to their frequency of record occurrence for the specific database columns. The frequency of record occurrence is the sum of the records belonging to each affected attribute of the SQL table. The value range of each SQL table is split into some predetermined number of attributes, for instance using quantile statistics. Each attribute represents a certain number of records within the database table. For example, a column variable AGE may be subdivided into an adequate number of subranges, e.g., 20<AGE, 30<AGE, 40<AGE, etc., having an open upper limit, or both limits closed as 20<AGE<30, 30<AGE<40, etc.

Figure 2:
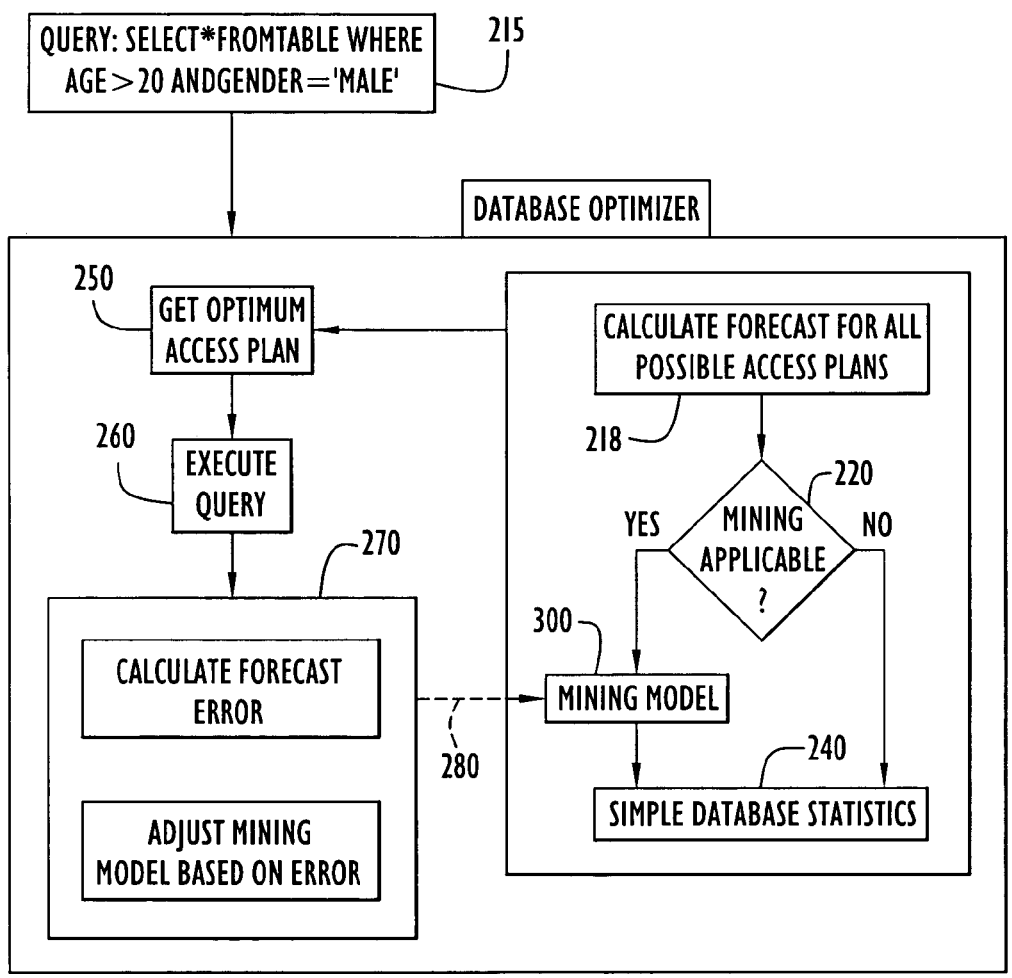
FIG. 2 is a schematic representation of the basic control flow, when applying the models generated according to FIG. 1 for selectivity forecasts according to the present invention.

Before entering into details about how those frequencies are determined, the overview representations of FIGS. 1, 2 and 3 is continued:

Once the frequency $Z_i$ of a column-specific query condition is determined by determining the cardinality of respective conditions, this result will preferably be normalized, preferably by dividing it by the absolute number of rows comprising the table i.e. the selectivity thereof is calculated as described further above. Thus, the result can be used for further calculation independently of the absolute number of rows in the table.

In other words, the query conditions must be mapped to a mining data set according to the invention. In general, it is assumed that the query conditions can be "translated" into cardinalities, i.e., a number of qualifying records corresponding to each query.

An absolute cardinality may be used for instance:

age>30 qualifies 200 rows, a preferred way, however, is to use a relative cardinality referred to herein as "selectivity" as described further above. The selectivity is much more stable in a statistical sense for adding and deleting of records from a table.

For instance, having a table with 1000 rows which has 200 rows with (age>30), the following is obtained:

(age>30)=20 (as percentage base)

or (age>30)=0.20 (interval scaled [0, . . . , 1])

Cardinalities for a single column are preferably handled as follows:

The cardinalities are preferably determined according to the invention by using simple (e.g. "built-in") database statistics, for instance:

AGE>=30 AND AGE<60 is calculated by cardinality of interval (30,60)

GENDER="FEMALE" is calculated by cardinality of all "FEMALE"s

AGE<20 OR AGE>50 is calculated by cardinality of (−infinite,20)+(50,+infinite).

The above mentioned variables $Z_i$ are used to determine at step 155 the selectivity based on cardinality.

Thus, when the cardinality of each of the plurality of possible different conditions $c_{jk}$ referring to the same column is estimated within the Data Mining model instead of being recorded from a vast plurality of different queries and respective particular conditions $c_{jk}$, then the present invention approach can be used very efficiently, as only the correlations between conditions are concerned. For example, they may be estimated by interpolation or by any other given distribution over the range of the valid column attribute value interval. The reason behind this is that the number of independent model variables is kept small as opposed to an exponential increase of the data model.

In a further step 160, training records are generated from the selectivity values.

Preferably, one record comprises the logical expression relating to a single table only and the selectivity results only from one column, or a plurality of ANDed expressions inside one and the same database table. Thus, in this preferred implementation for example, a JOIN always generates at least two records, i.e., one per table.

The steps are then repeated for the next query, see the branch back to step 110, 120.

If a sufficient number of queries is processed and a respective number of training records was generated, the sampled data may be used for the so-called TRAINING of the model, which basically may take place independently, for example at the same time with the sampling of data, if this is desired in order to preserve up-to-date prediction models.

In more detail, in a step 180 the training records generated as described above are read from their storage location.

Further, in a step 190, according to the invention a plurality of models is generated, preferably one per database table by aid of conventional Data Mining methods. The models are then trained for AND conditions (for more details, see below) in a step 200.

This way, the unique quality of Data Mining methods is exploited according to the invention to find out unknown context, i.e., the correlations between single column attributes, as Data Mining methods are known to provide the most success in these problems.

Thus, as a result of step 200, a plurality of regression functions, linear ones, or non-linear ones are found and assembled, and stored for each multiple tuple of conditions $c_{jk}$ showing the correlation between two or more column attributes of a single table at step 210.

In FIG. 2, the application of the trained models 300 is described in context with an exemplary database query 215, as e.g.,

"SELECT*FROM TABLE WHERE AGE>20 AND GENDER="MALE":

In a first step 220 of the task 218 to forecast query selectivity of incoming queries 215, those queries are analyzed with a filter criterion similar to that of step 120, i.e., it is filtered, if the present invention Mining-based method is applicable, or not. Additionally, a model must exist, which is not out-dated. If this is the case, see the Yes branch of decision 220, the query is transformed to comprise only AND connectors. The conditions $c_{jk}$ of the query are identified, and the respective Data Mining model 300 with a respective regression function as described earlier is selected, for application.

Then in a step 240 the prediction formula is composed by synthesis over the one or multiple (in case of a JOIN) regression results, and the underlying selectivity estimates are done by cross checking with simple database statistics.

In the NO-branch of decision 220, any other conventional approach may be selected for prediction which was already mentioned in the introductory part in here.

Further, the best suited access plan can be selected for accessing the database by executing the query, step 250, step 260.

Further, in an optional block 270, the forecast value may be compared to the number of query qualifying records resulting from the actual database access, and a respective error results as the difference therebetween. Then, of course, the Mining model which was used to forecast can be adjusted based on the error calculation in a usual feedback control loop, see the broken line arrow 280.

In FIG. 3, a structural overview is given in this situation illustrating that the same or similar queries 110, 215 may be used for sampling the data and for applying the trained models 300. The training records 330 are used for setting up the models and training them, thus yielding the trained models 300, which are used in turn with freshly incoming queries for prediction 310 of their selectivity estimate of specific database 320 accesses.

Next, more details are given for determination of frequencies of column attributes in the database. The frequencies $Z_i$ for single columns are determined preferably as follows:

The conventional SQL interpreter used by the present invention analyzes the SQL query and determines for each column a set of intervals describing the query condition.

| column | query condition | | |
|---|---|---|---|
| age | (>= 10 and <= 20) | | |
| age | or (>= 30 and < 40) | | set of intervals |
| age | or (>= 50 and <= 60) | $^{ref}Column_{age}$ | [10, 20] |
| salary | (< 10000) | | or [30, 40] |
| salary | or (> 20000 and < 3000) | | or [50, 60] |
| salary | or(> 50000) | | |

For each single $Column_i$ of a given database table, the frequency $Z_i$ is determined by adding up the number of qualifying records for each subrange, which is additionally expressed in pseudocode form.

Pseudocode:
For each interval of $Column_i$
Add the number of records to sum
Return$^{sum}$ Sample 2.1

The number of qualifying records for a given single interval is determined according to this embodiment by adding up the number of qualifying records that are found within this subrange. In addition, a pseudocode representation is given as follows:
Pseudocode:
For each attribute of the column
If upper border of attribute<lower border of interval
Continue loop;
If upper border of attribute>upper border of interval
Continue loop;
Sum up number of records of the attribute
Return summed up number of records.

Sample 2.2

Queries spawning multiple database tables by way of a JOIN condition, may be represented in the related art by so-called INNER JOINS and so-called OUTER JOINS.

They are preferably handled according to this preferred embodiment as follows:

A) Inner Joins

The basic assumption used by the present invention for processing INNER JOIN conditions is that the Cartesian product of the number of qualified records for each table is:

Number of Records=Table $A$×Table $B$×Table $C$.

For each table, the number of qualified records is used. It is also assumed that the number of qualified records from Table B is directly dependent upon the number of qualified records from Table A.

The assumption for the processing of inner joins is that the SQL interpreter provides an access plan for executing the joins, such that the plan tells the program to start the access with table $T_1$ which qualifies cardinality$_1$. The output cardinality $_1$ is then input for second table $T_2$ (cardinality$_1$, ... ) which qualifies cardinality$_2$. The product of the last table in the join specifies the result of this query. Thus, in other words, the table-specific estimate result is used as an input parameter for a further calculation of a table-combining cardinality estimate. To do this calculation, the regression formula is modified according to this embodiment.

Eq. 1 given above will thus be modified such that for each table there is at least one join column J containing the number of frequencies given defined from the predecessor table in the access plan. The frequency for the first column is preferably defined as all records of this table.

For a single table, the formula for the estimated Cardinality CE is $$\text{cardinality} = f(J) + \sum_{i=1}^{L} f(Z_i) + \text{Error} \quad \text{(eq. 1.1)}$$

Or, alternatively, for each join attribute a Join column $J_i$, can be introduced which leads to $$\text{cardinality} = \sum_{i=1}^{L} f(J_i) + \sum_{i=1}^{L} f(Z_i) + \text{Error} \quad \text{(eq. 1.1.1)}$$

in which J,$J_i$ represent the number of qualified records from the join condition from other tables, and each $Z_i$ describes the frequency of record occurrence for one or more query conditions $c_{jk}$ referring to one and the same database column.

f(J) and f($Z_i$) are best defined to belong to a specific type of regression function, and L defines the number of columns within this table.

Instead of using an additive regression function, this may also be changed to a multiplicative regression model:

$$\text{cardinality} = f(J) \prod_{i=1}^{L} f(Z_i) + \text{Error} \quad \text{(eq. 1.2)}$$

According to the present invention, the multiplicative model can be transformed into a linear model by using the logarithm, because in this specific case there are only positive and zero values for J and $Z_i$; this leads to:

$$\text{cardinality}^\circ = f(J)^\circ + \sum_{i=1}^{L} f(Z_i)^\circ + \text{Error} \quad \text{(eq. 1.2.1)}$$

where cardinality$^\circ$=ln(cardinality); $J^\circ$=ln(J+$m_*$) and $Z_i^\circ$=ln($Z_i$+$m_*$) with $m_*$>0 to include zero values and $m_*$=0 if the zero values are defined as missing values and therefore the zero values not occurring in the equation.

A further model, which may also be used by the present invention and which has similar attributes as provided by the multiplicative model (see eq. 1.2) is given by the additive model but using a variance-stabilization method. This model can be described as:

$$\text{cardinality}^T = f(J^T) + \sum_{i=1}^{L} f(Z_i^T) + \text{Error} \quad \text{(eq. 1.3)}$$

where the transformed variables are defined as:

cardinality$^T$=signum(cardinality)$ln$(|cardinality|+1);

$J^T$=signum(J)$ln$(|J|+1) and $Z_i^T$=$ln$(|$Z_i$|+1).

It starts with eq. 1.3, which is very similar in its behavior to a multiplicative model, but does not have the limitations for negative or zero values. It could be now applied to any regression function applicable to this type of data.

Inner Joins Spawning Multiple Tables:

The present invention can be continued for any of the equations 1.1, 1.1.1, 1.2, 1.2.1 or 1.3. As an exemplary embodiment, it is continued with eq. 1.3. Multiple inner joins can then be calculated as:

$$\text{cardinality}^T = \sum_{i=1}^{L} \left( f(J_{i-1}^T) + \sum_{k=1}^{M_i} f(Z_{ik}^T) \right) + \text{Error} \quad \text{(eq. 2.1)}$$

with L tables, $M_i$ column for table i, $f(J_{i-1}^T)$ and $f(Z_{ik}^T)$ as the regression functions on the transformed column frequencies $Z_{ik}^T$ and the transformed join frequencies $J_{i-1}^T$, where $J_0^T$ is equal to the number of records of the first table within the join.

B) Outer Joins

Outer joins are preferably handled as follows:

A sample OUTER JOIN Expression is given as follows: SELECT*FROM T1 Left Outer Join T2 ON T1.C1=T2.C1, in which T1, T2 are tables, and C1, C2 are columns.

The cardinality of an outer join is defined as:

cardinality of Outerjoin=(cardinality of Normal Join)+(cardinality of Anti-join) (eq. 2.2.1)

The normal join is SELECT*FROM T1,T2 WHERE T1.C1=T2.C1

The Anti-Join cardinality is the number of rows from T1 with C1 values that do not exist in T2.

The following can be used as an approximation according to the invention:

Outer join cardinality=MAX(cardinality of Normal Join, cardinality of T1) (eq. 2.2.2)

Next, the self-tuning optimization is described in more detail:

As disclosed in the introduction a self-tuning optimization is needed. This aspect is captured in the present invention concepts by recording all queries for a given table, such that these queries are mapped to the regression problem already described. These mapped records are then repeatedly, preferably periodically used to train a respective new regression model.

The new regression model is then used to replace the respective existing regression model. By doing this, the advantage is achieved that the used regression model automatically focuses on the most often used queries. Another advantage is that the dynamic behavior of a database is also reflected, because the new training records reflect the new number of contained records within this table.

Further, an automatism is advantageously obtained that needs no user interaction. By updating the regression model using the latest queries, the regression model will be synchronized with the dynamically changing content of a database table and/or with the changing type of interests from the users. That means, if the most often used query conditions are changing, the prediction quality is also changed for new areas.

The foregoing approach is further adapted to cover particular undefined states in which no valid regression model is available. Undefined states may be present for instance at the startup phase or during the run-phase of a database where either no training queries are available, or too few training queries are available to update the respective existing regression model, while concurrently the existing regression model becomes outdated, because the content of the database has been changed too much.

In view of these phases, a combined method is proposed, in which regression models are used when available and statistically reliable. For the remaining phases, it is proposed to use a conventional approach.

Next, details on updating the regression model are described. The present invention may start with an empty regression model. In this phase, the classical estimation model based on attributes will be used.

A new model is calculated either on request, for instance during the typically used statistics collection command of the database, or on a timely defined manner, for instance during a periodic partial load phase, or automatically after reaching a statistically sufficient number of sample queries.

An existing regression model is updated, when it is thought to be outdated, and if a new model exists. It is also replaced if it is not outdated, but the prediction quality of the new model is better than the old one, which may be learned for instance from a parallel operation of two different models with the same query. An existing model may preferably also be removed, if the table has been changed significantly and either no new queries or an insufficient number of queries have been sampled so far.

Next, details are given on how to improve the sampling of query information.

In order to reduce phases, in which no valid regression model is available due to a lack of sample queries, a combined approach is proposed, as follows: A FIFO (first in, first out) buffered concept is used to record the given user queries. When the maximum size N of the FIFO buffer is reached, the oldest query from the top of this buffer is removed and the latest query is appended. Instead of removing all training queries after a new model creating phase, the training data within the FIFO buffer is still available for the next model creation phase. If there is no new data added, there is no need for building a new model. A very important aspect here is that very few new queries are necessary to be able to train a model with the respective changing user interest. This is possible, because the old queries are also available within the FIFO buffer. Therefore, the model can be always created with the last N records, whereby N is independent of the actual queries since the last model build process.

Next, details will be given on how to handle ongoing changes to a database table. The simplest approach according to the present invention will remove an existing regression model and the training queries, when the table is changed at all, or if the table is changed significantly. In both cases a default—i.e., a standard conventional approach—is used instead of the regression model.

A more sophisticated approach includes adding an additional attribute to the training queries and also one to a regression model indicating for instance the corresponding size of the table. If this additional attribute exceeds a certain threshold interval which is intended to illustrate the logical reliability of the data, these objects are outdated.

The first check is, whether the model is outdated. If the model is outdated, the model is removed. If the model is removed, the training data is checked and the data, which is outdated, is removed. If sufficient training data is available, a new model is built.

Next, details will be given, on how to reflect ongoing database changes into the regression model.

The related art approach already described above consists of training the model periodically. This, however, does not reflect changes which take place permanently in a typical manner for databases, i.e., which take place currently and thus instantly.

Such instant changes can be addressed by the concepts of the present invention with the assumption that the underlying correlation of column attributes is stable over time in a statistical sense. What actually changes instantly, is the number of qualified records—the cardinality. Therefore, the present invention is further enriched to comprise a so called 'instantly normalized model', which is done using the selectivity of column attributes and predicting the standardized cardinality of a table. Modifying equation 1.1.1 we get a standardized or normalized cardinality "$S_{cardinality}$":

$$S_{cardinality} = \sum_{i=1}^{L} f(J_i) + \sum_{i=1}^{L} f(Z_i) + Error \quad \text{(eq. 3.1)}$$

$$cardinality(t) = S_{cardinality} \cdot TableCardinality(t)$$

with $Z_i$=ColumnCardinality(t)/TableCardinality(t) and $J_i$ as the standardized cardinalities of the joined tables at sampling time. When applying the regression models, the standardized cardinality is then multiplied with the table cardinality to get the cardinality according to the actual database table size for prediction purposes. It should be noted that the cardinality is changing over the time t between sampling time and application time of the mining model.

In other words, the present invention may be further improved to comprise the steps of:

a) normalizing the cardinality associated to a sampled query with the table size, which is valid when the query is sampled, and b) denormalizing the cardinality associated to a query, the cardinality is to be predicted, with the table size, which is valid when the query's selectivity is to predicted.

Thus, the stored regression models comprise normalized, i.e., standardized values, and the prediction is done based on a—denormalization with actual up-to date values of cardinality. Thus, the regression models are time-independent and thus match best to the time-independent nature of correlations, which they refer to.

This normalized model is advantageous compared to related art approaches of mining, because it normalizes the queries with the table size at that point in time when they occur. This is done for each query. Therefore, each query does have it's time depend upon the normalization factor. In the application, each time a query is predicted, the current table size is used as de-normalization factor. This instantly performed normalization and de-normalization comprising respective changing normalization factors enables use of the present invention for such typical ongoing changes of the database.

The present invention can be realized in hardware, software, or a combination of hardware and software. A tool according to the present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program in the present context means any expression, in any language, code or notation, of a set of instructions intended to cause a system having an information processing capability to perform a particular function either directly or after either or both of the following:

a) conversion to another language, code or notation;

b) reproduction in a different material form.

The invention claimed is:

1. A method for estimating a selectivity of a query containing at least one column-associated condition related to column attributes of a relational database table, the method comprising:

(a) generating a dataset by sampling a plurality of queries applied against the database, wherein the dataset includes a plurality of query conditions and information related to combinations of said query conditions, wherein step (a) further includes:

(a.1) generating a dataset including queries $q_j$, j=1, . . . N, wherein each query includes a plurality of column-associated conditions $c_{jk}$, k=1, . . . $M_j$, N, M being integer variables, wherein step (a.1) further includes:

(a.1.1) storing a cardinality C of an elementary operation associated with a column-associated condition $c_{jk}$,
(a.1.2) storing a count of query-qualifying database records reflecting the correlation between the database table column attributes referred to in each elementary operation,
(b) determining at least one regression function that reflects correlations between particular query conditions based on said dataset,
(c) determining a table-specific estimate of a cardinality of a query based upon the regression function serving as a data mining model, wherein step (c) further includes:
(c.1) calculating a cardinality estimate CE of said query with the following formula:

$$CE = \sum_{i=1,\ldots L} f(Z_i)$$

wherein $f(Z_i)$ is the regression function, CE is a total of correlations between the plurality of combinations of elementary operations used in said sampled queries, and $Z_i$ is a frequency of occurrence for one or more column-associated conditions $c_{jk}$, and wherein said regression function is updated using said data mining model.

2. The method of claim 1, wherein step (c) further includes:
(c.2) selecting an access method for an incoming query from a plurality of database access methods based upon the table-specific estimate for said incoming query.

3. The method of claim 1, wherein said query includes column associated conditions related to a plurality of tables, wherein step (c) further includes:
(c.2) determining a table-combining cardinality estimate based upon said table-specific estimate.

4. The method of claim 1, wherein step (c) further includes:
(c.2) estimating the cardinality of each of the plurality of column-associated conditions $c_{jk}$ referring to the same column using the data mining model.

5. The method of claim 1, wherein step (c.1) further includes:
(c.1.1) training the model by using queries that include logical AND operators to determine a correlation between corresponding column predicates.

6. The method of claim 1, wherein step (c.1) further includes:
(c.1.1) transforming a query containing OR predicates to an equivalent query containing AND predicates to simplify training of a model.

7. The method of claim 1, wherein step (c) further includes:
(c.2) normalizing the determined cardinality based upon a total number of rows in the database table.

8. The method of claim 1, wherein step (c) further includes:
(c.2) normalizing the cardinality associated with a sampled query with a size of the database table when the query is sampled, and
(c.3) denormalizing a cardinality associated with a query for which a cardinality is to be predicted with the size of the database table when the selectivity for that query is predicted.

9. The method of claim 1, wherein step (b) further includes:
(b.1) using a subset of frequently used queries to determine said regression function.

10. The method of claim 1, wherein step (b) further includes:
(b.1) repeatedly training said regression function with updated sampled data.

11. The method of claim 1, wherein step (a) further includes:
sampling said queries via a tool based on a database optimizer.

12. The method of claim 1, wherein step (a) further includes:
determining cardinalities for individual table columns via a database statistics tool, and
mapping queries that include a plurality of logical AND operators to corresponding cardinality based regression formulae.

13. The method of claim 1, wherein step (a) further includes:
(a.2) mapping queries that include at least one of an inner join and an outer join to corresponding regression formulae based on at least one of cardinality and selectively operations.

14. A computer system for estimating a selectivity of a query containing at least one column-associated condition related to column attributes of a relational database table, the system comprising:
a sampling module for generating a dataset by sampling queries applied against the database, wherein the dataset includes a plurality of query conditions and information related to combinations of said query conditions, wherein the sampling module further comprises:
a dataset module for generating a dataset including queries $q_j$, j=1, . . . N, wherein each query includes a plurality of column-associated conditions $c_{jk}$, k=1, . . . $M_j$, N, M being integer variables, wherein said dataset module further comprises:
a first storage module for storing a cardinality C of an elementary operation associated with a column-associated condition $c_{jk}$, and
a second storage module for storing a count of query-qualifying database records reflecting the correlation between the database table column attributes referred to in each elementary operation,
a regression module for determining at least one regression function that reflects correlations between particular query conditions based on said dataset,
a processing module for determining a table-specific estimate of a cardinality of a query based upon the regression function serving as a data mining model, wherein the processing module further comprises:
an estimation module for determining a cardinality estimate CE of said query with the following formula:

$$CE = \sum_{i=1,\ldots L} f(Z_i)$$

wherein $f(Z_j)$ is the regression function, CE is a total of correlations between the plurality of combinations of elementary operations used in said sampled queries, and $Z_i$ is a frequency of occurrence for one or more column-associated conditions $c_{jk}$ and wherein said regression module further comprises a function module for updating said regression function using said data mining model.

15. The system of claim 14, wherein the processing module selects an access method for an incoming query from a plurality of database access methods based upon the table-specific estimate for said incoming query.

16. The system of claim 14, wherein the processing module estimates the cardinality of each of the plurality of column-associated conditions $c_{jk}$ referring to the same column using the data mining model.

17. The system of claim 14, wherein said query includes column associated conditions related to a plurality of tables, and wherein the processing module determines a table-combining cardinality estimate based upon said table-specific estimate.

18. The system of claim 14, wherein the processing module trains the model by using queries that include logical AND operators to determine a correlation between corresponding column predicates.

19. The system of claim 14, wherein the processing module transforms a query containing OR predicates to an equivalent query containing AND predicates to simplify training of a model.

20. The system of claim 14, wherein the processing module normalizes the determined cardinality based upon a current total number of rows in the database table.

21. The system of claim 14, wherein the processing module normalizes the cardinality associated with a sampled query with a size of the database table when the query is sampled, and denormalizes a cardinality associated with a query for which a cardinality is to be predicted with the size of the database table when the selectivity for that query is predicted.

22. A program product apparatus having a computer readable medium with computer program logic recorded thereon for estimating a selectivity of a query containing at least one column-associated condition related to column attributes of a relational database table, said program product apparatus comprising:
- a sampling module for generating a dataset by sampling queries applied against the database, wherein the dataset includes a plurality of query conditions and information related to combinations of said query conditions, wherein the sampling module further comprises:
  - a dataset module for generating a dataset including queries $q_j$, j=1, ... N, wherein each query includes a plurality of column-associated conditions $c_{jk}$, k=1, ... M1, N, M being integer variables, wherein said dataset module further comprises:
    - a first storage module for storing a cardinality C of an elementary operation associated with a column-associated condition $c_{jk}$, and
    - a second storage module for storing a count of query-qualifying database records reflecting the correlation between the database table column attributes referred to in each elementary operation,
  - a regression module for determining at least one regression function that reflects correlations between particular query conditions based on said dataset,
  - a processing module for determining a table-specific estimate of a cardinality of a query based upon the regression function serving as a data mining model, wherein the processing module further comprises:
    - an estimation module for determining a cardinality estimate CE of said query with the following formula:

$$CE = \sum_{i=1,...L} f(Z_i)$$

wherein f $(Z_i)$ is the regression function, CE is a total of correlations between the plurality of combinations of elementary operations used in said sampled queries, and $Z_i$ is a frequency of occurrence for one or more column-associated conditions $c_{jk}$, and wherein said regression module further comprises a function module for updating said regression function using said data mining model.

23. The program product of claim 22, wherein the processing module selects an access method for an incoming query from a plurality of database access methods based upon the table-specific estimate for said incoming query.

24. The program product of claim 22, wherein said query includes column associated conditions related to a plurality of tables, and wherein the processing module determines a table-combining cardinality estimate based upon said table-specific estimate.

25. The program product of claim 22, wherein the processing module estimates the cardinality of each of the plurality of column-associated conditions $c_{jk}$ referring to the same column using the data mining model.

26. The program product of claim 22, wherein the processing module trains the model by using queries that include logical AND operators to determine a correlation between corresponding column predicates.

* * * * *